United States Patent
Bowman et al.

(10) Patent No.: US 8,180,511 B2
(45) Date of Patent: May 15, 2012

(54) HYBRID VEHICLE CONTROL APPARATUS AND METHOD

(75) Inventors: Tim James Bowman, Bexley (GB); Robert Helle-Lorentzen, Chelmsford (GB); Don Andreas Josephine Kees, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 12/690,344

(22) Filed: Jan. 20, 2010

(65) Prior Publication Data

US 2010/0185352 A1    Jul. 22, 2010

(30) Foreign Application Priority Data

Jan. 21, 2009 (GB) .................................. 0900948.1

(51) Int. Cl.
*B60K 6/22* (2007.10)
*B60W 10/02* (2006.01)
*B60W 10/18* (2006.01)
*B60W 10/24* (2006.01)
*B60W 20/00* (2006.01)
*B60W 10/06* (2006.01)
*B60K 6/08* (2006.01)

(52) U.S. Cl. ................ 701/22; 701/54; 701/67; 701/69; 701/101; 701/110

(58) Field of Classification Search ............ 701/22, 701/36, 51, 53–54, 67, 69–70, 93, 101–102, 701/110; 180/65.1, 65.265

See application file for complete search history.

(56) References Cited

U.S. PATENT DOCUMENTS

| | | | | |
|---|---|---|---|---|
| 4,171,029 A * | 10/1979 | Beale | ......................... | 180/54.1 |
| 6,962,223 B2 * | 11/2005 | Berbari | ......................... | 180/165 |
| 7,416,039 B1 * | 8/2008 | Anderson et al. | ............ | 180/165 |
| 2004/0262062 A1 * | 12/2004 | Berbari | ......................... | 180/165 |
| 2008/0105475 A1 | 5/2008 | Hu | | |

FOREIGN PATENT DOCUMENTS

EP    0473556 A2 *  3/1992

OTHER PUBLICATIONS

SAE 2008-01-0083, "Fuel Economy and Performance Comparison of Alternative Mechanical Hybrid Powertrain Configurations", Andrew Barr and Alireza Veshagh, University of Warwick, 2008 World Congress, Detroit, MI, Apr. 14-17, 2008.

* cited by examiner

*Primary Examiner* — Khoi Tran
*Assistant Examiner* — Dale Moyer
(74) *Attorney, Agent, or Firm* — David B. Kelley, Esq.; MacMillan, Sobanski & Todd, LLC

(57) ABSTRACT

A hybrid vehicle has an internal combustion engine 2 and a flywheel 9. Storage and release of energy by the flywheel 9 is enabled by a continuously variable transmission 10 and clutch 11 under the control of an electronic module 14. The amount of energy transferred from the vehicle one to the flywheel 9 during a deceleration manoeuvre is maximized by increasing the engine speed. As a result, the engine does more work against the braking force of the accelerating flywheel and causes the flywheel to spin up to a higher rotational speed.

5 Claims, 1 Drawing Sheet

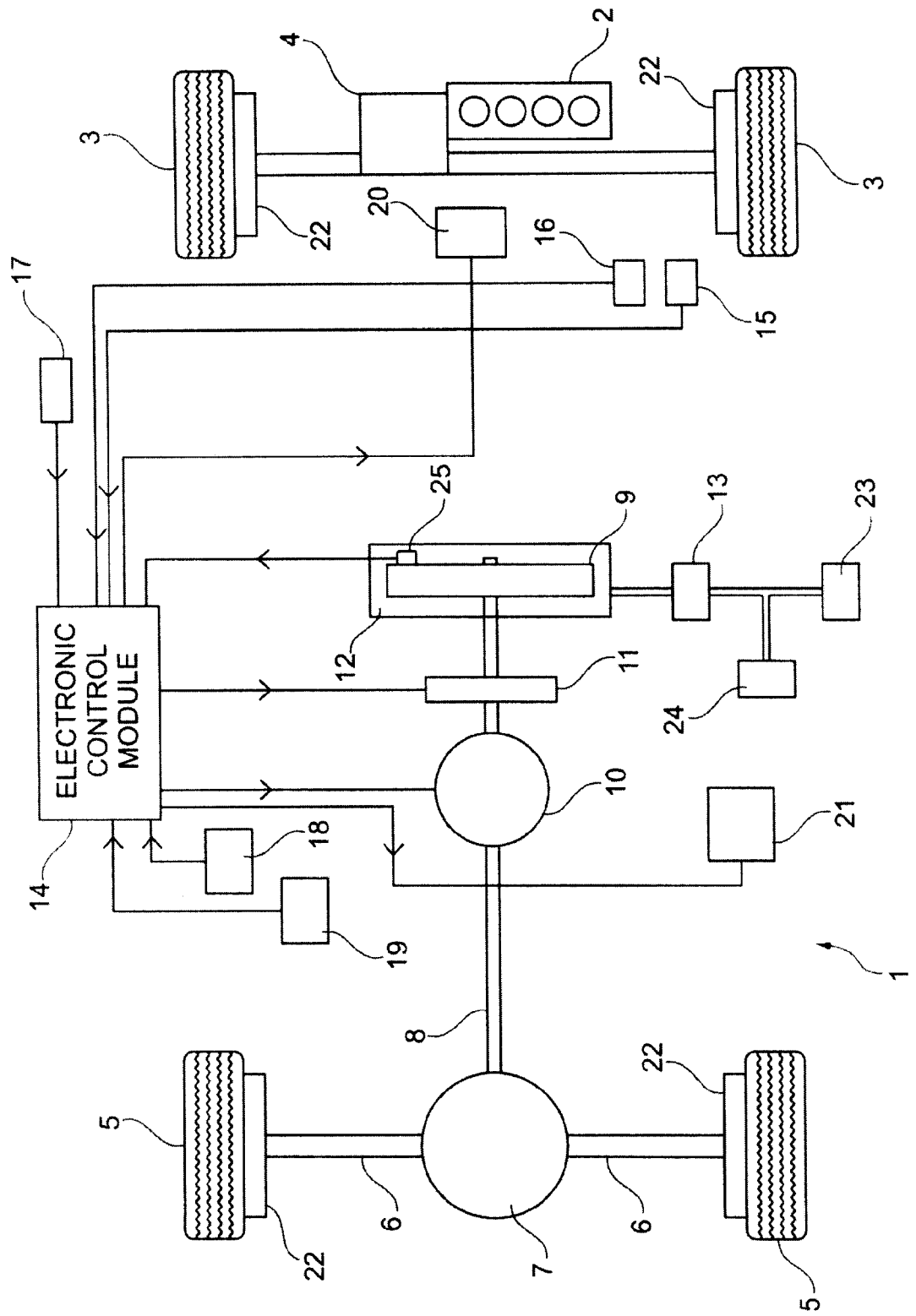

HYBRID VEHICLE CONTROL APPARATUS AND METHOD

BACKGROUND OF THE INVENTION

This invention relates to an apparatus and method for controlling a vehicle having a prime mover and a secondary mover which incorporates an energy storage device. The invention has particular application to a hybrid vehicle whose prime mover is an internal combustion engine and whose secondary mover incorporates a flywheel but is not limited to this combination.

SAE technical paper 2008-01-0083, Apr. 14-17, 2008, describes an arrangement consisting of a continuously variable transmission (CVT) connected between the engine and gearbox of a vehicle and configured to drive a flywheel through a gearset. The arrangement can add or subtract power to that supplied by the engine to a driven pair of wheels of the vehicle. The flywheel can be spun up in order to capture the kinetic energy of the vehicle as it decelerates. This is regenerative braking.

U.S. 2008/0105475 discloses an automotive vehicle having a powertrain for the vehicle, a flywheel and a continuously variable transmission which interconnects the powertrain and the flywheel. When the vehicle decelerates, energy from the powertrain and its associated transmission is transferred to the flywheel. When the vehicle accelerates, the energy of the flywheel is transferred to the powertrain.

In a flywheel-based energy storage and recovery system, manipulation of the CVT ratio achieves control of energy storage and recovery. When the ratio is set so as to speed up the flywheel, energy is stored and when the ratio is set so as to slow down the flywheel, energy is recovered.

The power output from an energy storage device such as a flywheel can supplement that of the prime mover. Consequently it is possible to increase the total output power of the vehicle or downsize the prime mover. The latter option provides further fuel efficiency savings. However, particularly in the case where the prime mover is an internal combustion engine, a downsized engine produces correspondingly lower levels of low speed torque compared with a conventionally-sized engine. This is likely to cause "drivability" problems. For example, when pulling away from rest and when the flywheel has low or zero levels of stored energy, the secondary mover is unable to supplement the power available from the engine and there is a deterioration in the vehicle's performance as perceived by the driver. Hence there can be an inconsistency of supplementary power available for a hybrid vehicle. This can cause drivability concerns and preclude opportunities for engine downsizing.

The present invention aims to mitigate this deleterious effect on drivability.

SUMMARY OF THE INVENTION

According to a first aspect, the invention consists of a control unit for a hybrid vehicle having a prime mover and an energy storage device, the control unit being adapted to generate control signals for increasing a power output of the prime mover and coupling the energy storage device to a drivetrain of the vehicle when the control unit receives an input signal from a vehicle sensor indicative of a vehicle deceleration demand.

In a second aspect, the invention comprises a method of operating a hybrid vehicle having a prime mover and an energy storage device, including the steps of: whilst the vehicle is in motion, detecting a vehicle deceleration demand, increasing a power output of the prime mover and coupling the energy storage device to a drivetrain of the vehicle.

In a third aspect, the invention comprises a hybrid vehicle having a prime mover and an energy storage device, a sensor for detecting a vehicle deceleration demand, a control unit for receiving a signal from the sensor and for generating control signals, and coupling means responsive to at least one of said control signals for coupling the energy storage device to a drivetrain of the vehicle, the control unit being adapted to generate said control signals to increase the power output of the prime mover and couple the energy storage device to the drivetrain when the sensor detects said vehicle deceleration demand whilst the vehicle is in motion.

The invention provides a means to aggressively charge the flywheel at a rate that exceeds that which would normally be possible from a deceleration manoeuvre. When a driver demand indicates a deceleration, through accelerator and brake pedal positions for example, instead of the engine power output being allowed to reduce, it is actively increased. The flywheel-based energy storage and recovery system manipulates the CVT ratio so as to speed up the flywheel and thereby absorb the excess power produced by the engine. The surplus power created by the engine is absorbed by the flywheel. The flywheel is actively charged.

This process can be gainfully deployed at any condition where the anticipated demand on the flywheel exceeds the available energy. Hence, a strategy can be formulated, by way of adaptive learning, which prepares the flywheel to a state of charge ready in anticipation of its next usage profile. Such a strategy can be formed by learning vehicle usage profiles by employing onboard trip recorders, global positioning and navigation systems for example.

The sensor for detecting the vehicle deceleration demand may be an accelerator pedal position sensor, thus indicating the driver's desire for the vehicle to decelerate when the driver lifts his/her foot off the accelerator pedal.

Alternatively, a brake pedal position sensor may be employed, detecting a desire to decelerate when the driver depresses the brake pedal.

Alternatively, a desire to decelerate may be indicated by an on-board cruise control system which detects when the driver has cancelled a cruise operation.

The prime mover may be an internal combustion engine, an electric motor or fuel cell, for example.

The energy storage device may be a rechargeable battery, for example. Alternatively, the energy storage device may be a flywheel and the coupling means may comprise a continuously variable transmission and clutch arrangement as is conventionally used in flywheel hybrid vehicles. In response to a signal from the control unit to the coupling means, the clutch connects the flywheel to the driveline and the CVT adjusts its ratio so that energy is transferred from the driveline to the flywheel.

The invention is capable of being incorporated in any internal combustion engine-flywheel hybrid architecture. For example, the vehicle could be configured to have a first axle driven by the engine with the flywheel being connectable to a second axle via a separate driveline. Alternatively, the engine and flywheel could be connectable to the same axle via a common driveline.

If all of the energy to be dissipated during a deceleration manoeuvre is captured by charging up the energy storage device, then it is likely that the foundation brakes of the vehicle are rarely deployed. This then creates the problem of the probable seizure of the mechanical components of the vehicle's braking system.

To guard against such a problem, the invention provides the option of providing the control unit with some additional functionality. Specifically, a strategy is deployed that ensures that the foundation brakes are periodically deployed at a frequency calculated to ensure that seizure of the foundation brakes cannot occur. This can be achieved by transferring less energy to the energy storage device than is available from the prevailing kinetic energy of the vehicle. For a given demand for deceleration, the surplus energy will need to be dissipated by the foundation brakes. Ideally, the foundation brakes are deployed in a manner that maximises the potential for preventing seizure yet minimising the concomitant lost energy storage. This is likely to occur at low vehicle speeds.

Accordingly, in a further aspect, the invention comprises a hybrid vehicle having a prime mover and an energy storage device, a sensor for detecting a deceleration demand, a control unit for receiving a signal from the sensor and for generating control signals, coupling means responsive to at least one of said control signals for coupling the energy storage device to a drivetrain of the vehicle, and a vehicle braking system control module responsive to at least one of said control signals for operating vehicle braking system components, the control unit being adapted to generate, when the sensor detects a deceleration demand, said control signals to couple the energy storage device to the drivetrain and to periodically modulate the braking effort and the magnitude of the energy transfer from the vehicle to the energy storage means in a manner that maximises prevention of seizure of braking system components while minimising concomitant lost energy storage.

In a hybrid vehicle where the energy storage device incorporates a flywheel, the flywheel is usually contained in an evacuated housing. The housing advantageously has a vacuum pump associated therewith for maintaining a desired low pressure in order to keep aerodynamic losses to a minimum. In a further aspect, the present invention provides a hybrid vehicle having a prime mover, a braking system including a braking system vacuum pump, a flywheel contained within an evacuated housing and a housing vacuum pump, in which the operation of the housing vacuum pump is assisted by the braking system vacuum pump.

A pressure of typically between 1 mbar and 3 mbar is maintained in the flywheel housing by a vacuum pump that is usually electrically driven. This housing vacuum pump is periodically operated to maintain the necessary pressure levels and at a frequency that depends upon the performance of the sealing system. The electrical power required to operate this pump reduces the overall fuel consumption improvement of the flywheel energy storage and recovery system and the pump itself has to be capable of working on a pressure gradient from atmospheric pressure (of typically 1 bar) down to 1 mbar. Further, following extended periods of non-use, it may take this pump some time to achieve an acceptable housing pressure level where the flywheel can be safely operated. In one embodiment of the invention, instead of venting the housing vacuum pump to the atmosphere, it is instead vented into the vacuum supply that operates the vehicle's servo-assisted braking system. As a consequence, the demands made on the housing vacuum pump are reduced as it now only needs to reduce pressure from around 400 mbar-600 mbar absolute pressure, rather than from atmospheric.

BRIEF DESCRIPTION OF THE DRAWINGS

Some embodiments of the invention will now be described, by way of example only, with reference to the drawings of which;

FIG. 1 is a schematic block diagram of a hybrid vehicle having a flywheel-based energy storage system.

DETAILED DESCRIPTION OF THE PREFERRED EMBODIMENT

With reference to the drawing, a vehicle 1 is equipped with an internal combustion engine 2 which provides motive power solely to a first set of wheels 3 through a gearbox and final drive assembly 4.

A second set of wheels 5 is connected via half shafts 6 and a final drive and differential unit 7 to a propshaft 8. The propshaft can drive and be driven by a flywheel 9. Interposed between the propshaft 8 and flywheel 9 is a transmission unit 10 having a continuously variable gear ratio. An electro hydraulic clutch 11 is provided for decoupling the CVT 10 (and consequently the wheels 5) to and from the flywheel 9 under certain operating conditions.

A pressurised supply of oil is supplied to the CVT 10 by an oil pump (not shown) which is driven by the propshaft 8.

The flywheel is contained within an evacuated housing 12 to which is connected a housing vacuum pump 13.

An electronic control module ECM 14 receives inputs from an accelerator pedal position sensor 15, brake pedal position sensor 16, a cruise control system 17, a trip computer 18 and a navigation system 19. Output connections from the electronic control module 14 are made to the CVT 10, the clutch 11, an engine control module 20 and a brake control module 21.

The engine control module 20 serves to control the power output of the engine 2. The brake control module 21 serves to activate brakes 22 associated with each pair of wheels 3, 5. A brake system vacuum pump 23 and brake accumulator (servo) 24 are also provided, serving to assist the housing vacuum pump 13 in keeping the housing 12 at the desired low pressure. A speed sensor 25 measures the rotational speed of the flywheel 9 and signals this to the ECM 14.

The CVT 10 can be of conventional design whose ratio can be varied in a known manner by operation of solenoid valves (not shown) which control the oil flow. Activation of the valves is under the control of the ECM 14.

Some exemplary modes of operation of the embodiment of FIG. 1 will now be described.

With the vehicle running at a steady speed with light pressure on the accelerator pedal and the clutch 11 held open, no drive will be transmitted from the second set of wheels 5 to the flywheel 9 and so the latter will remain stationary. However, oil pressure will be supplied to the CVT 10 by the pump which is being driven by the propshaft 8. If the driver should release the accelerator pedal or depress the brake pedal (or cancel cruise control), this is detected by one of the sensors 15, 16 or 17 and relayed to the electronic control module 14. This signifies to the ECM 14 that a deceleration demand has been made. Hence the vehicle is now in a position to transfer energy from its own forward motion to the flywheel rather than letting it be dissipated through friction in the brakes.

In one example, the vehicle 1 is travelling on a journey which the driver regularly makes. The on-board trip computer 18 and navigation system 19 have fed data into the ECM 14 such that the ECM 14 knows, at any point during the journey, what the vehicle will encounter in terms of changes in terrain (e.g., inclines, declines) and traffic situations (e.g. the necessity to stop at junctions and restart from rest). Say, for instance, that the driver requests a deceleration of the vehicle because the vehicle is approaching a junction where he has to stop. The driver lifts his foot off the accelerator pedal and depresses the brake pedal. This is sensed by the pedal position sensors 15 and 16. The ECM 14 will also know that the junction is approaching and that the vehicle will need to stop and then set off from rest again, accelerating up to a certain speed. The ECM 14 calculates the energy which needs to be releasable from the flywheel 9 in order to assist the engine 2 in accelerating the vehicle 1 away from the approaching junction at an acceptable rate (to the driver). It compares this calculated energy with the energy it predicts will be stored in the flywheel 9 under normal regenerative braking circumstances by the time the junction is reached. (If any energy is already stored in the flywheel 9 the ECM 14 will be able to calculate this, knowing the flywheel's speed by virtue of the speed sensor 25). If the comparison reveals that there will be insufficient releasable energy, then the ECM 14 sends a signal to the engine control module 20 to increase the power output of the engine 2 by a calculated amount for a calculated period of time. The engine control module 20 responds by adjusting the engine operating parameters (such as air/fuel mixture throughput). The ECM 14 also closes the clutch 11 and sets the CVT ratio at the optimum value for maximum transference of energy from the propshaft 8 to the flywheel 9 while the engine 2 is producing the additional power. Hence the flywheel 9 can be spun up to a higher speed than would be possible if the engine power were allowed to reduce during the deceleration manoeuvre. When the vehicle sets off again after stopping at the junction, the ECM 14 adjusts the CVT ratio so that energy is now transferred from the charged flywheel 9 to the propshaft 8, so assisting the engine 2 in propelling the vehicle 1. Hence, less fuel is used in moving the vehicle off from rest than would have been used without the assistance of the charged flywheel 9.

Another situation in which the invention may be advantageously employed, is when the navigation system 19 alerts the ECM 14 to the fact that the vehicle is approaching a hill. The ECM 14 again calculates a flywheel energy necessary to give assistance to the engine 2 in climbing the hill. So, during the next deceleration manoeuvre, it instructs the engine control module 20 to increase engine power appropriately, sets the CVT ratio and closes the clutch 11. Once the flywheel 9 has spun up to the desired speed, the clutch 11 can be opened until the incline commences. Then the clutch 11 can be closed and the CVT ratio set so that energy is transferred from the flywheel 9 to the propshaft 8. The flywheel 9 now assists the engine 2 in climbing the hill. Hence a smaller and less powerful engine can appear to behave as a more powerful one to the driver.

The action of connecting the flywheel 9 to the prop shaft 8 and allowing the former to spin up slows down the vehicle 1. Therefore the foundation brakes 22 will be seldom used. Hence, to prevent seizure of the mechanical components of the braking system, the ECM 14 periodically sends a signal to the brake control module 21 to activate the brakes 22 in response to a deceleration demand.

The braking system also comprises the vacuum pump 23 and a servo 24, the former being driven by the engine 2. The brake system vacuum pump 23 acts as a backing pump for the flywheel housing vacuum pump 13, the latter being driven by the vehicle's electrical supply (not shown) and serving to keep the pressure in the housing 12 at the desired level so that flywheel aerodynamic losses are kept to a minimum.

We claim:

1. A method for operating a hybrid vehicle, comprising:
   (a) whilst the vehicle is in motion, detecting a vehicle deceleration demand,
   (b) in response to said demand increasing power produced by a prime mover and transmitting said power to a first wheel set,
   (c) connecting an energy storage device to an input of a transmission by actuating a clutch,
   (d) transmitting torque from a second wheel set through an output of the transmission and the clutch to the energy storage device, and
   (e) after said demand is removed, accelerating the vehicle by transmitting torque from the energy storage device through the clutch and transmission to the second wheel set.

2. The method of claim 1, wherein actuating the clutch further includes hydraulically actuating the clutch.

3. The method of claim 1, wherein the clutch is actuated hydraulically.

4. The method of claim 1, wherein step (d) further includes adjusting a gear ratio produced by the transmission.

5. The method of claim 1, wherein step (e) further includes adjusting a gear ratio produced by the transmission.

\* \* \* \* \*